(12) United States Patent
Gupta et al.

(10) Patent No.: US 11,225,618 B1
(45) Date of Patent: Jan. 18, 2022

(54) CONTINUOUS DESULFURIZATION PROCESS BASED ON METAL OXIDE-BASED REGENERABLE SORBENTS

(71) Applicant: SUSTEON INC., Cary, NC (US)

(72) Inventors: Raghubir Prasad Gupta, Durham, NC (US); Brian Scott Turk, Durham, NC (US)

(73) Assignee: SUSTEON INC., Cary, NC (US)

( * ) Notice: Subject to any disclaimer, the term of this patent is extended or adjusted under 35 U.S.C. 154(b) by 0 days.

(21) Appl. No.: 17/425,868

(22) PCT Filed: Jan. 28, 2020

(86) PCT No.: PCT/US2020/015432
§ 371 (c)(1),
(2) Date: Sep. 30, 2021

(87) PCT Pub. No.: WO2020/160004
PCT Pub. Date: Aug. 6, 2020

Related U.S. Application Data

(60) Provisional application No. 62/797,541, filed on Jan. 28, 2019.

(51) Int. Cl.
*B01D 53/82* (2006.01)
*B01J 8/02* (2006.01)
(Continued)

(52) U.S. Cl.
CPC ............... *C10K 1/32* (2013.01); *B01D 53/22* (2013.01); *B01D 53/346* (2013.01); *B01D 53/52* (2013.01); *B01D 53/82* (2013.01); *B01D 53/96* (2013.01); *B01J 8/02* (2013.01); *B01J 19/0033* (2013.01); *B01J 20/0203* (2013.01); *B01J 20/28011* (2013.01); *B01J 20/28059* (2013.01); *B01J 20/28071* (2013.01); *B01J 20/28073* (2013.01); *B01J 20/3078* (2013.01); *C10K 1/004* (2013.01); *C10K 1/26* (2013.01); *B01D 2253/1124* (2013.01); *B01D 2253/306* (2013.01); *B01D 2253/311* (2013.01); *B01D 2257/304* (2013.01);
(Continued)

(58) Field of Classification Search
None
See application file for complete search history.

(56) References Cited

U.S. PATENT DOCUMENTS 5,494,880 A 2/1996 Siriwardane
5,703,003 A 12/1997 Siriwardane
(Continued)

*Primary Examiner* — Daniel Berns
(74) *Attorney, Agent, or Firm* — Hultquist, PLLC; Steven J. Hultquist

(57) ABSTRACT

A continuous desulfurization process and process system are described for removal of reduced sulfur species at gas stream concentrations in a range of from about 5 to about 5000 ppmv, using fixed beds containing regenerable sorbents, and for regeneration of such regenerable sorbents. The desulfurization removes the reduced sulfur species of hydrogen sulfide, carbonyl sulfide, carbon disulfide, and/or thiols and disulfides with four or less carbon atoms, to ppbv concentrations. In specific disclosed implementations, regenerable metal oxide-based sorbents are integrated along with a functional and effective process to control the regeneration reaction and process while maintaining a stable dynamic sulfur capacity. A membrane-based process and system is described for producing regeneration and purge gas for the desulfurization.

8 Claims, 3 Drawing Sheets

(51) Int. Cl.
  *B01J 19/00* (2006.01)
  *B01J 20/02* (2006.01)
  *B01J 20/28* (2006.01)
  *B01J 20/30* (2006.01)
  *C10K 1/00* (2006.01)
  *C10K 1/26* (2006.01)
  *C10K 1/32* (2006.01)
  *B01D 53/22* (2006.01)
  *B01D 53/34* (2006.01)
  *B01D 53/52* (2006.01)
  *B01D 53/96* (2006.01)

(52) U.S. Cl.
  CPC .. *B01D 2257/306* (2013.01); *B01D 2257/308* (2013.01); *B01J 2219/00051* (2013.01); *B01J 2219/00162* (2013.01); *B01J 2219/00164* (2013.01); *B01J 2219/00186* (2013.01); *B01J 2220/56* (2013.01)

(56) References Cited

U.S. PATENT DOCUMENTS

| | | |
|---|---|---|
| 5,866,503 A | 2/1999 | Siriwardane |
| 5,980,846 A | 11/1999 | Tatani et al. |
| 2005/0022449 A1 | 2/2005 | Katikaneni et al. |
| 2005/0070430 A1 | 3/2005 | Gangwal et al. |
| 2010/0115839 A1 | 5/2010 | Brown et al. |
| 2014/0298992 A1 | 10/2014 | Carruthers et al. |

CONTINUOUS DESULFURIZATION PROCESS BASED ON METAL OXIDE-BASED REGENERABLE SORBENTS

CROSS-REFERENCE TO RELATED APPLICATION

This is a U.S. national phase under 35 USC § 371 of International Patent Application PCT/US2020/015432 filed Jan. 28, 2020, which claims the benefit under 35 USC § 119 of U.S. Provisional Patent Application 62/797,541 filed Jan. 28, 2019 in the names of Raghubir Prasad Gupta and Brian Scott Turk for CONTINUOUS DESULFURIZATION PROCESS BASED ON METAL OXIDE-BASED REGENERABLE SORBENTS. The disclosure of International Patent Application PCT/US2020/015432 and the disclosure of U.S. Provisional Patent Application 62/797,541 is are hereby incorporated herein by reference, in their respective entireties, for all purposes.

BACKGROUND

Technical Field

The present disclosure relates to a process and apparatus for the removal of hydrogen sulfide, carbonyl sulfide, carbon disulfide, and/or thiols and disulfides with four or less carbon atoms, from gas mixtures containing same. The process and apparatus in various embodiments herein described particularly relate to sorbent requirements, commercial sorbent production processes and sorbent compositions, process design, processing conditions, and target applications for the continuous removal of hydrogen sulfide, carbonyl sulfide, carbon disulfide, and/or thiols and disulfides with four or less carbon atoms from gas mixtures with fixed beds of regenerable sorbents. The present disclosure also relates in a further aspect to the field of oxygen separation from air, and more particularly to a process and apparatus for generating gas mixtures with low oxygen concentrations from air, e.g., regeneration gas mixtures with low oxygen concentrations that are suitable for maintaining stable desulfurization performance for fixed bed regenerable desulfurization sorbents, through multiple regeneration cycles.

Description of the Related Art

Gas mixtures that comprise reduced sulfur species can be generated by a plurality of commercial chemical processes. These chemical processes include, without limitation, hydrodesulfurization of crude oil and its derivatives, gasification and/or partial oxidation processes based on carbonaceous feed stocks like coal, biomass, petroleum coke, resid, sour natural gas, municipal solid waste, and pyrolysis processes based on biomass, coal, and other carbonaceous feed stocks such as coke oven gas or syngas generated during pyrolysis of biomass/waste and the like. Sour gas streams generated during the sulfur recovery processes such as in Claus plants or in sour water strippers in refineries and petrochemical plants can also contain such reduced sulfur species. Even pipeline natural gas includes reduced sulfur-based odorants (thiols, disulfides, or other commercial odorants) for safety reasons associated with leak detection. The presence of these reduced sulfur species in gas mixtures adversely impacts processes designed to extract energy or convert these gas mixtures into value-added chemicals. These reduced sulfur species are corrosive, and they rapidly and irreversibly poison most commercial catalysts, in addition to which the quantity and specific reduced sulfur species that can be released to the environment are highly regulated by environmental authorities. Consequently, the standard practice is to remove the reduced sulfur species from gas mixtures prior to processing.

During the generation of these gas mixtures, the sulfur present in the feed stocks is converted to primarily hydrogen sulfide ($H_2S$), but also carbonyl sulfide (COS), carbon disulfide ($CS_2$), and lighter thiols such as methanethiol ($CH_3SH$) and ethanethiol ($C_2H_5SH$).

Removal of these reduced sulfur species is accomplished by a plurality of commercial processes that depend on the relative concentration of these sulfur species in the gas mixture. At higher reduced sulfur concentrations (>5,000 ppmv), the predominant processes include either chemical or physical solvent systems. Sulfur removal process technology commercialized under the trademarks Selexol™ and Rectisol® are two commercial examples of these technologies. The Rectisol® process is the preferred process for chemical production applications as the effluent sulfur concentration from a Rectisol® process is typically <50 ppbv, which is the typical sulfur concentration required for protecting sulfur-sensitive catalysts such as water gas shift, methanation, Fisher Tropsch, and methanol synthesis catalysts.

The Selexol™ sulfur removal process is very selective for $H_2S$, but struggles to remove other sulfur species, particularly COS. With a Selexol™-based desulfurization process, an additional preprocessing step, to convert the COS into $H_2S$ via a hydrolysis reaction, may be required, resulting in additional capital and operating costs for removal of sulfur species besides $H_2S$. Not all solvent-based desulfurization processes have this issue, but most do.

$H_2S$ removal could also be accomplished by caustic washing. The caustic wash chemistry differs significantly from the typical chemistry associated with physical and chemical solvents. One difference is that the caustic in the caustic wash cannot be regenerated like a physical or chemical solvent, and must be continuously replenished with fresh caustic to maintain the desired desulfurization performance. The cost associated with continuously replenishing this caustic is a significant operating cost, which increases proportionally to the concentration of reduced sulfur species. In addition, separation and conversion of the captured sulfur species into a suitable form that is acceptable for disposal requires significant additional processing. These disadvantages make caustic wash cost prohibitive when the sulfur concentration in the gas mixture is high. These disadvantages also reduce commercial applications for caustic washing to a few niche applications for which better alternative technologies are not available.

Another technology that is used for $H_2S$ removal from sour gases, primarily from natural gas, but in some instances from syngas, is based on liquid redox systems using chelating agents such as iron, cobalt, vanadium, arsenic, and the like. In these systems, $H_2S$ is first physically absorbed on an oxidizing form of an absorbent (e.g., $Fe^{3+}$), which is subsequently oxidized with air to produce elemental sulfur. This process is extensively used to desulfurize natural gas to produce a pipeline quality gas handling sulfur in amounts of 1 to 25 tons/day. However, the use of this process for syngas is limited due to highly flammable nature of the syngas components, namely $H_2$ and CO. Furthermore, this process suffers from a number of technical issues, including degradation of chelating agents, high chemical make-up costs, formation of sulfur oxo-anions, and plugging of the absorber due to salt formation. For small quantities of sulfur removal, typically below 5 ton/day, this process is not cost-competitive.

At lower sulfur concentrations, disposable zinc oxide-based guard bed materials may be used to remove hydrogen sulfide to below 0.1 ppmv. Zinc oxide guard bed materials are produced by many large catalyst manufacturers including Haldor Topsoe, Johnson Matthey, and Clariant.

The specific desulfurization processes selected for a specific commercial process are based on process economics. For higher concentrations of reduced sulfur species in gas streams, chemical and physical solvent-based processes achieve very low capital and operating costs per unit mass of sulfur removed. For very small amounts of $H_2S$ in process gas streams, typically below 10 ppmv, disposable zinc oxide guard beds, which entail just a fixed bed of sorbent that must be replaced when a majority of the active zinc oxide is consumed and the $H_2S$ concentration in the guard bed effluent begins to increase, is a common industrial approach Because of the small $H_2S$ concentration, the guard bed does not need to be replaced frequently and the resulting replacement cost for the zinc oxide guard bed material is generally not cost-prohibitive.

For gas mixtures comprising sulfur in a range of from about 5 ppmv to about 5,000 ppmv, existing commercial sulfur removal processes generally are not very cost-effective, a circumstance which creates a significant economic penalty for utilization of these gas mixtures, particularly to produce value-added chemicals and fuels. Sulfur concentrations in the range of from 5 ppmv to 5,000 ppmv are found in large number of industrial applications, such as syngas produced from gasification and/or partial oxidation of low-sulfur coals, biomass, and solid waste, as well as in coke oven gas, hydrogen streams in refinery operations downstream of hydrodesulfurization/hydrotreating processes, during tail gas treatment in Claus sulfur recovery processes, and the like.

The catalytic hydrodesulfurization/hydrotreating process is used for converting organic sulfur species during refining of hydrocarbons into $H_2S$, which is subsequently removed by an $H_2S$ removal process. This catalytic hydrodesulfurization process requires significant amounts of hydrogen to drive the process. Only a small fraction of the hydrogen is typically consumed in the process to primarily convert refractory and recalcitrant sulfur species (like benzothiophenes and their substituted derivatives) in the feed into hydrogen sulfide. To effectively use this hydrogen, it must be recycled back to the hydrodesulfurization reactor. However, the $H_2S$ must be removed from this hydrogen stream prior to its recycle back to the reactor. For processing of hydrocarbon fractions with higher sulfur concentrations, conventional physical or chemical solvent-based desulfurization processes are cost-effective. However, for straight-run fractions such as straight run naphtha, which have lower sulfur concentrations, dedicated caustic wash systems are frequently used, because the $H_2S$ in this process stream is relatively small and the value of the product derived can tolerate higher operating costs associated with continuous consumption of caustic solution. In addition, the caustic wash systems are problematic and challenging for operators to operate and maintain, which escalates the already high operating costs, as well as producing substantial amounts of spent caustic solution that must be safely disposed of. In some instances, the $H_2S$-containing $H_2$ stream from the hydrodesulfurization unit is recycled without any $H_2S$ removal, except for purging it from the recycle loop to maintain a desired $H_2S$ concentration at the inlet of the hydrodesulfurization reactor. This is typically achieved by purging part of the recycle stream resulting in higher than necessary operating cost for hydrogen consumption, which adversely and unacceptably affects the overall profitability of the process facility.

Solvent-based desulfurization processes are also applied for natural gas sweetening. For natural gas sweetening, the current solvent-based systems remove acid gases, which consist of the $H_2S$ and $CO_2$. To meet environmental regulations, this solvent-based acid gas removal (AGR) system must also separate the reduced sulfur species from the $CO_2$ for processing to minimize the release of sulfur emissions to the environment. This processing adds additional processing equipment and process complexity, which increases capital and operating cost of the AGR system.

Commercial Claus-based sulfur recovery plants achieve the high level of sulfur capture necessary to meet strict environmental sulfur emission limits by using a desulfurization process to capture a majority of the sulfur in the Claus plant tail gas. The Claus plant is typically capable of removing between 97% and 98% of the sulfur from the tail gas stream. Environmental regulations require over 99% sulfur removal. The tailgas desulfurization system provides the additional sulfur capture needed to meet the environmental requirements. Currently, the tail gas from the Claus plant is catalytically converted from a mixture containing elemental sulfur, sulfur dioxide, $H_2S$ and COS into a mixture with just $H_2S$ and COS. These reduced sulfur species are then removed from the tail gas reducing the sulfur concentration in the tail gas to below the allowable sulfur emissions concentration for release to the environment. The standard commercial process for the capture of these reduced sulfur species are solvent-based desulfurization systems. In these solvent-based desulfurization systems, prior to desulfurization, COS must be hydrolyzed into $H_2S$ in a separate catalytic reactor. Because of the small concentrations of sulfur in these tail gas streams, the high level of sulfur removal required, and the overall small amount of sulfur being treated, solvent-based processes are complex and cost-prohibitive.

These examples illustrate specific commercial applications where there is a critical need for a simplified and cost-effective continuous desulfurization system that is designed for removing from about 5 ppmv to about 5,000 ppmv of reduced species in the various gas streams discussed above.

Regenerable fixed-bed sorbents are generally based on active metal oxides that react with $H_2S$ at appropriate temperature and pressure conditions to form metal sulfides and these metal sulfides can be reacted with oxygen at suitable temperature and pressure conditions to release the sulfur as $SO_2$ and regenerate the active metal oxide. Additional components of such sorbent could include binder materials to provide form and strength, and promoters for enhancing reactivity and physical and chemical stabilities. The regenerable sorbent in specific embodiments may for example include a sorbent oxide, e.g., zinc oxide, manganese oxide, copper oxide, iron oxide, or compatible mixtures of two or more of the foregoing. Such sorbent may optionally and additionally include inert refractory oxide such as titania, other inert material(s) such as silica gel, and binder such as bentonite or other clays, calcium sulfate, etc. In other embodiments, the regenerable sorbent may comprise oxides and/or metal salts of metals such as zinc, manganese, copper, iron, chromium, or compatible mixtures of two or more of the foregoing, wherein the metal salts may for example include any one or more of acetates, formates, carbonates, and nitrates. Optionally, such sorbent may include any of: (i) inert material such as one or more of silica gel, silica, alumina, alumina gel, titania gel, calcium sulfate, zinc silicate, zinc aluminate, and sand; (ii) inert diluent material including one or more of titanium oxide, calcium sulfate, calcium phosphate, calcium silicate, magnesium sulfate, zinc silicate, zinc aluminate, and aluminosilicates; (iii) binder such as one or more of bentonite, kaolinite, other aluminosilicates, calcium sulfate, and cement; and (iv) promotor including one or more of oxides or salts of one or more of copper, iron, cobalt, manganese, and nickel. Additional examples of such regenerable sorbent are described in U.S. Pat. Nos. 5,494,880; 5,866,503, and 5,703,003, the disclosures of all of which are incorporated herein by reference.

Although regeneration reactions can be proposed for almost any metal oxide/metal sulfide combination, the key differentiator for the regenerable sorbent from the generic sulfur guard bed sorbent is its ability to be regenerated numerous times. If a sorbent cannot be effectively regenerated more than 50 times without deteriorating desulfurization and regeneration performance, then the sorbent will not be cost-effective in comparison to a generic sulfur guard bed sorbent that is non-regenerable in character, and is intended to be utilized without regeneration until the sorbent is loaded to a final or predetermined extent, following which the guard bed is removed for disposal, and replaced by a fresh guard bed. To achieve the requirement to withstand a large number of desulfurization and regeneration cycles, a sorbent must possess specific chemical and physical properties.

Sorbent porosity, pore volume, and surface area are some of the key physical properties that are essential in evaluating the ability of a sorbent to withstand a large number of desulfurization/regeneration cycles. High porosity generally provides faster kinetics for the desulfurization reaction; it however leads to poor crush strength and hence should be carefully controlled to get the proper balance of kinetics and crush strength. Sorbent porosity must be able to accommodate molecular volume change associated with conversion of metal oxide (~14 cc/mole for zinc oxide) to the metal sulfide (~22 cc/mole for zinc sulfide). Therefore, porosity is a critically important selection/evaluation criterion for a successful regenerable fixed-bed sorbent. The reactivity of the active metal oxide, which affects the rates of sulfur absorption and regeneration reactions and the temperature dependence of both the desulfurization and regeneration reactions, depends on the dispersion of the active metal oxide on the support, surface area, and porosity. Pore volume and surface area also affect reactivity and stability of the active metal oxide and/or sulfide clusters. Thermal and chemical cycling during the desulfurization and regeneration cycles may lead to sintering and changes in the physical properties that can have an adverse effect on sorbent performance. Finally, the sorbent must have suitable crush strength to be used in a large sorbent bed without the sorbent being crushed under its own weight and the sorbent must maintain this strength despite thermal and chemical cycling.

Important chemical properties for regenerable fixed-bed sorbents include total sulfur absorption capacity, rate of sulfur absorption, rate of regeneration, dynamic sulfur capacity, and sorbent deactivation rate. The total theoretical sulfur absorption capacity is directly related with the active metal oxide content of the sorbent. It is determined by the active metal oxide content of the sorbent and the stoichiometry of the desulfurization reaction divided by the initial sorbent mass (active metal oxide in the oxidized state). For example, a sorbent with 50 wt % ZnO and 50 wt % inerts will have a theoretical sulfur capacity of 19.66 wt %. As compared with the theoretical sulfur capacity, the actual sulfur capacity is the measure of the mass of sulfur taken up by the sorbent during actual exposure to a gas mixture containing reduced sulfur species. The theoretical sulfur capacity and actual sulfur capacity differ because not all of the active metal oxide may be accessible to the sulfur species in the process gas. The actual sulfur capacity is calculated based on the mass of sulfur removed divided by the original sorbent mass. For example, a sorbent with 50 wt % ZnO and 50 wt % inerts may have a total theoretical sulfur capacity of 19.66 wt % sulfur and an actual sulfur capacity of about 17 wt %. During the first cycle, the sulfur loading is typically higher than subsequent cycles. This is due to the fact that not all of the sulfur can be removed during regeneration and deactivation of the active metal species. Therefore, in the second desulfurization cycle, the sulfur removed is generally less than the first cycle. The working, or dynamic, sulfur capacity represents the mass of sulfur that can be removed between two successive cycles divided by the original mass of the sorbent. The dynamic sorbent capacity is typically measured in laboratory and bench-scale reactor systems with simulated gas mixtures during multi-cycle testing. Ideally, the dynamic capacity would remain fixed after the first cycle, but sorbent deactivation continues to change the dynamic capacity with each cycle. The dynamic sulfur capacity averaged over a large number of cycles is used for the process design of the fixed-bed system. Consequently, an important chemical property of the sorbent and process operation is to essentially minimize any deactivation, thereby maintaining the dynamic capacity stable.

Although many regenerate metal oxide sorbent have been proposed and tested at laboratory scale, adaptation of the lab-scale production processes into commercial processes that can produce the sorbent at a suitable cost for commercial application of a fixed-bed regenerate sorbent process has not been achieved in practice for many of these sorbents.

As is appreciated from the foregoing, sulfur is a key contaminant in hydrocarbon-based fuels. The impact of this sulfur during use of sulfur-laden hydrocarbon-based fuels include mechanical problems associated with corrosion of downstream process equipment, detrimental poisoning of catalysts, and/or environmental issues associated with the release of $SO_x$ to the environment. Because of these issues, processes to enable effective removal of the sulfur from hydrocarbon-based fuels have been developed. The most common approach for removing this sulfur is to convert the sulfur to $H_2S$, which has suitable chemical properties that enable various effective capture processes. One subset of these $H_2S$ removal processes involves sorbent materials based on metal oxides that interact with $H_2S$ to form sulfides. For low concentrations of $H_2S$, typically <1 ppm, the cost of replacing the sorbent, when all or a major amount of the metal oxide has been converted to a sulfide, is an acceptable operating expense. When the $H_2S$ concentration substantially exceeds 1 ppm, the cost of replacing the sorbent, when the metal oxide has been converted to metal sulfide, becomes prohibitive. For desulfurization of these streams, regenerable sorbents have been developed that can be regenerated by converting the metal sulfide back into the active metal oxide.

This regeneration process typically involves exposing the sulfur-laden sorbent to an oxidizing gas mixture resulting in the reaction, $M_xS_y+(2n+y) O_2=M_xO_n+y SO_2$, where M is a metal of the metal oxide sorbent. For many of the metals used in these regenerable desulfurization sorbents, the oxidation of the metal sulfide is exothermic. Because the rate at which this oxidation reaction consumes the metal sulfide on the sorbent is determined by the flow rate of the oxidizing gas and its oxygen concentration and the starting reaction temperature, regeneration processes use oxygen concentrations in the regeneration gas as a means of controlling the temperature rise resulting from regeneration. Preferred oxygen concentrations are typically <10% by volume. With the typical oxygen concentration in air being about 20% by volume, either a significant amount of diluent gas must be added, or a significant amount of oxygen must be removed. The three typically employed diluents are nitrogen, carbon dioxide, and steam. When any of these diluents is readily available and is not being used for another purpose, they may readily be used for generating a suitable oxidizing mixture for regeneration. However, sufficient amounts of the diluents are not usually readily available at low enough cost to support generation of a cost-effective oxidizing mixture for regeneration.

The fixed-bed continuous desulfurization process for regenerable sorbents may employ a set of fixed-beds of sorbent with one or more of these fixed-beds actively removing sulfur from sulfur-laden hydrocarbon-based fuels and the other or others being regenerated or otherwise waiting for resumption of active on-stream processing. The regeneration step involves purging the hydrocarbon-based fuel, which is reducing, with an inert; heating the sorbent bed to a suitable temperature to initiate the regeneration reaction; regeneration with low oxygen concentration regeneration gas; purging the regeneration gas, which is oxidizing, with an inert; and cooling the sorbent bed to a temperature suitable for resumption of desulfurization operation. The two purge steps prohibit the accidental mixing of the hydrocarbon fuel and an oxidizing mixture, which could form an explosive mixture. The inerts used may include nitrogen, steam, and $CO_2$. As for diluting air to generate the regeneration gas, the volumetric flow of these inerts available at a plant is limited. Thus, a simple and cost-effective means of generating an oxidizing mixture for regeneration and also an inert nitrogen stream from air would be a significant advantage for commercial applications of regenerable sorbents.

Taking all of the foregoing into consideration, there is a need for a continuous sulfur removal process for gas mixtures that is robust and cost-effective for sulfur concentrations between 5 ppmv and about 5,000 ppmv. There is a need for enhanced removal of the sulfur species that include not only $H_2S$, but also COS, $CS_2$, and thiols and disulfides with four or less carbon atoms. There is a need for regenerable sorbents with suitable physical and chemical properties that can be maintained over at least 100 cycles. There is a need for commercial processes for producing the regenerable sorbents at costs that enable commercial application of continuous fixed-bed regenerable sorbent processes. There is a need for efficient and cost-effective production of regeneration gas with reduced oxygen concentration from air.

The above-mentioned shortcomings, disadvantages and problems are addressed herein, and will be more fully understood from the following specification and ensuing claims.

Objectives of the Embodiments

A primary objective of the present disclosure is to provide a continuous desulfurization process that reduces the overall cost compared to conventional sulfur guard bed materials, and compared to chemical or physical solvent-based processes, of sulfur removal from gas mixtures containing between about 5 ppmv and about 5,000 ppmv of sulfur.

Another objective of the present disclosure is to effectively integrate a set of fixed-bed reactors with a functional process scheme that optimizes the efficiency of sorbent regeneration to achieve at least 100 absorption-regeneration cycles with essentially stable dynamic sulfur capacity.

Yet another objective of the present disclosure is to provide a set of operating parameters for the sorbent regeneration, comprising flow rate, oxygen concentration in the regeneration gas, and a heat management strategy, which enables effective regeneration optimizing the conversion of the metal sulfide back into metal oxide and minimizes side reactions that result in sorbent deactivation.

A further objective of the present disclosure is to significantly reduce the replacement cost for fixed-bed sorbent-based desulfurization processes using disposable guard beds, by defining a process that achieves effective desulfurization and regeneration for at least 100 cycles.

A still further objective of the present disclosure is to achieve effective direct removal of COS, $CS_2$, thiols and disulfides with four or less carbon atoms (without hydrolysis) as well as $H_2S$ in this continuous desulfurization process.

Another objective of the present disclosure is to provide a set of physical and chemical properties for a sorbent material suitable for desulfurization of the gas mixture under desired process conditions.

Yet another objective of the present disclosure is to provide a number of niche applications of this process in which the desulfurization cost can be significantly reduced, while simplifying the overall process scheme.

Another primary objective of the present disclosure is to provide an oxidizing gas mixture for regeneration of regenerable desulfurization sorbents that contains low concentrations of oxygen most suited for maintaining stable dynamic sulfur capacity over multiple desulfurization/regeneration cycles.

A further object of the present disclosure is to produce such oxidizing mixture and pressures suitable for the regeneration process.

Yet another object of the present disclosure is to generate the oxidizing gas for regeneration in a manner that is simple, cost-effective, and scalable with the desulfurization system.

A still further object of the present disclosure is to produce a nitrogen-based inert gas mixture at pressure that is suitable for purges between desulfurization and regeneration operations.

The foregoing and other objects, features, and advantages of the present disclosure will be more readily apparent from the following detailed description in conjunction with the accompanying drawings.

SUMMARY

The present disclosure in various embodiments relates to a continuous desulfurization process that reduces the cost, compared to conventional sulfur guard bed materials, and compared to chemical or physical solvent-based processes, of sulfur removal from gas mixtures containing from about 5 ppmv to about 5,000 ppmv of reduced sulfur species. This process uses a set of fixed-bed reactors utilizing a regenerable metal oxide-based sorbent in which one or more beds are being used to remove sulfur from a gas mixture and the other bed or beds are being regenerated or waiting to be returned to sulfur removal activity for subsequent use. Combined with this hardware is a functional process scheme that allows the switching of a plurality of valves directing gas between these different reactors resulting in the continuous production of a desulfurized gas mixture. Of specific importance in this process scheme is the regeneration process sequence, as it enables effectively managing the regeneration reaction rate, temperature rise due to the exothermic reaction, and transient process nature to achieve effective conversion of the metal sulfide component back into active metal oxide component while minimizing any side reactions, and completing this in a timeframe that supports the timing that makes the entire process work over a large number of desulfurization and regeneration cycles.

According to one embodiment herein, a set of fixed-bed reactors is effectively integrated with a functional process scheme that optimizes the efficiency of sorbent regeneration to achieve at least 100 regenerations with substantially stable dynamic sulfur capacity.

According to one embodiment herein, a set of optimized operating parameters for effective sorbent regeneration, which enables a regeneration optimizing the conversion of the metal sulfide back into active metal oxide and minimizing side reactions that result in sorbent deactivation, is provided for flow rate, oxygen concentration in the regeneration gas, and a heat management strategy.

According to one embodiment herein, replacement costs for fixed-bed sorbent-based desulfurization processes using disposable sorbents are significantly reduced by a process scheme that achieves effective desulfurization and regeneration for at least 100 cycles.

According to one embodiment herein, removal is achieved of COS and $CS_2$, thiols and disulfides with four or less carbon atoms without any need for a hydrolysis reactor, as well as simultaneous removal of $H_2S$ in this continuous desulfurization process.

The present disclosure in various embodiments relates to a process and process system for producing an oxidizing gas mixture for regeneration of regenerable desulfurization sorbents from air, having a range of oxygen concentration of from 1% by volume to 15% by volume, utilizing an air compressor and polymeric membrane system.

According to one embodiment herein, a process and process system are provided for producing an oxidizing gas mixture containing a low oxygen concentration at elevated pressures from air.

According to one embodiment herein, a process and process system are provided for producing a nitrogen-based inert mixture at pressure that is needed for purging between desulfurization and regeneration steps, involving consuming any remaining oxygen remaining in the low oxygen regeneration gas by reaction.

In one aspect, the present disclosure relates to a continuous operation desulfurization system for desulfurizing a gas stream containing reduced sulfur species at concentration in a range of from about 5 to about 5000 ppmv, wherein the reduced sulfur species is hydrogen sulfide ($H_2S$), carbonyl sulfide (COS), carbon disulfide ($CS_2$), thiol with four or less carbon atoms, disulfide with four or less carbon atoms, or a mixture of two or more of the foregoing reduced sulfur species, said system comprising: at least two primary adsorbent beds of desulfurization sorbent selective for said reduced sulfur species, constructed and arranged in relation to one another so that each of said adsorbent beds in operation undergoes a cyclic alternating and repeating sequence of (i) onstream desulfurization operation including contacting of said gas stream with the sorbent in the sorbent bed to produce a sulfur-reduced gas stream, and (ii) offstream regeneration operation including (a) contacting the sorbent in the sorbent bed with oxygen-containing regeneration gas to remove adsorbed sulfur species to produce a sulfur dioxide-containing regeneration gas, and optionally one or both of (b) heating of the sorbent in the sorbent bed and (c) purging of the adsorbent bed; a sulfur dioxide conversion unit constructed and arranged to process the sulfur dioxide-containing regeneration gas to remove sulfur dioxide therefrom and produce sulfur dioxide-depleted regeneration vent gas; valved flow circuitry constructed and arranged to selectively: (1) connect an onstream one of said at least two adsorbent beds of desulfurization sorbent in gas-receiving relationship with a source of the gas stream containing reduced sulfur species; (2) connect an offstream one of said at least two adsorbent beds of desulfurization sorbent in gas-receiving relationship with a source of the oxygen-containing regeneration gas; (3) flow the sulfur dioxide-containing regeneration gas from the offstream one of said at least two adsorbent beds of desulfurization sorbent to said sulfur dioxide conversion unit, and discharge sulfur dioxide-depleted regeneration vent gas from said sulfur dioxide conversion unit; and a controller constructed and arranged to operate valves of the valved flow circuitry in response to at least one of (A) a monitored system operating condition, and (B) a cycle time program, so that each one of said at least two adsorbent beds of desulfurization sorbent cyclically, alternatingly and repetitively undergoes said sequence of (i) onstream desulfurization operation and (ii) offstream regeneration operation, in the continuous operation of the system. Such system may optionally further comprise at least one disposable guard bed of desulfurization sorbent selective for the reduced sulfur species, constructed and arranged to contact the sulfur-reduced gas stream, from an onstream one of the at least two primary adsorbent beds, with the guard bed desulfurization sorbent to produce a sulfur-depleted gas stream.

In another aspect, the present disclosure relates to a continuous operation desulfurization process for desulfurizing a gas stream containing reduced sulfur species at concentration in a range of from about 5 to about 5000 ppmv, wherein said reduced sulfur species is hydrogen sulfide ($H_2S$), carbonyl sulfide (COS), carbon disulfide ($CS_2$), thiol with four or less carbon atoms, disulfide with four or less carbon atoms, or a mixture of two or more of the foregoing reduced sulfur species, such process comprising: providing at least two primary adsorbent beds of desulfurization sorbent selective for said reduced sulfur species, constructed and arranged in relation to one another so that each of said adsorbent beds in operation undergoes a cyclic alternating and repeating sequence of (i) onstream desulfurization operation including contacting of said gas stream with the sorbent in the sorbent bed to produce a sulfur-reduced gas stream, and (ii) offstream regeneration operation including (a) contacting the sorbent in the sorbent bed with oxygen-containing regeneration gas to remove adsorbed sulfur species to produce a sulfur dioxide-containing regeneration gas, and optionally one or both of (b) heating of the sorbent in the sorbent bed and (c) purging of the adsorbent bed; contacting the gas stream with the sorbent in the sorbent bed of an onstream one of said at least two primary adsorbent beds, to produce the sulfur-reduced gas stream; during said contacting of the gas stream with the sorbent in the sorbent bed of the onstream one of said at least two primary adsorbent beds, regenerating an offstream one of said at least two primary adsorbent beds by contacting the sorbent in the offstream adsorbent bed with the oxygen-containing regeneration gas, to produce the sulfur dioxide-containing regeneration gas, and optionally performing at least one of heating and purging of the offstream adsorbent bed in said regenerating; processing the sulfur dioxide-containing regeneration gas to remove sulfur dioxide therefrom and produce sulfur dioxide-depleted regeneration vent gas; and controlling the process in response to at least one of (A) a monitored system operating condition, and (B) a cycle time program, so that each one of said at least two adsorbent beds of desulfurization sorbent cyclically, alternatingly and repetitively undergoes said sequence of (i) onstream desulfurization operation and (ii) offstream regeneration operation, in the continuous operation of the process. Such process may further comprise contacting the sulfur-reduced gas stream from an onstream one of the at least two primary adsorbent beds with desulfurization sorbent in at least one guard bed, to produce a sulfur-depleted gas stream.

A further aspect of the present disclosure relates to a continuous operation desulfurization process for desulfurizing a gas stream containing reduced sulfur species at concentration in a range of from about 5 to about 5000 ppmv, wherein said reduced sulfur species is hydrogen sulfide ($H_2S$), carbonyl sulfide (COS), carbon disulfide ($CS_2$), thiol with four or less carbon atoms, disulfide with four or less carbon atoms, or a mixture of two or more of the foregoing reduced sulfur species, such process comprising operation of the continuous operation desulfurization system as described hereinabove.

These and other aspects, features and embodiments of the present disclosure will be better appreciated and understood when considered in conjunction with the following description and the accompanying drawings. It is to be understood, however, that the following descriptions, while indicating preferred embodiments and numerous specific details thereof, are given by way of illustration and not of limitation, and that changes and modifications may be made within the scope of the present disclosure without departing from the spirit thereof, and the disclosed embodiments herein are intended to include all such modifications.

BRIEF DESCRIPTION OF THE DRAWINGS

The objects, features, and advantages of the present disclosure will be more fully apparent to those skilled in the art from the following description of the preferred embodiments and accompanying drawings, in which.

DETAILED DESCRIPTION

Figure 1:
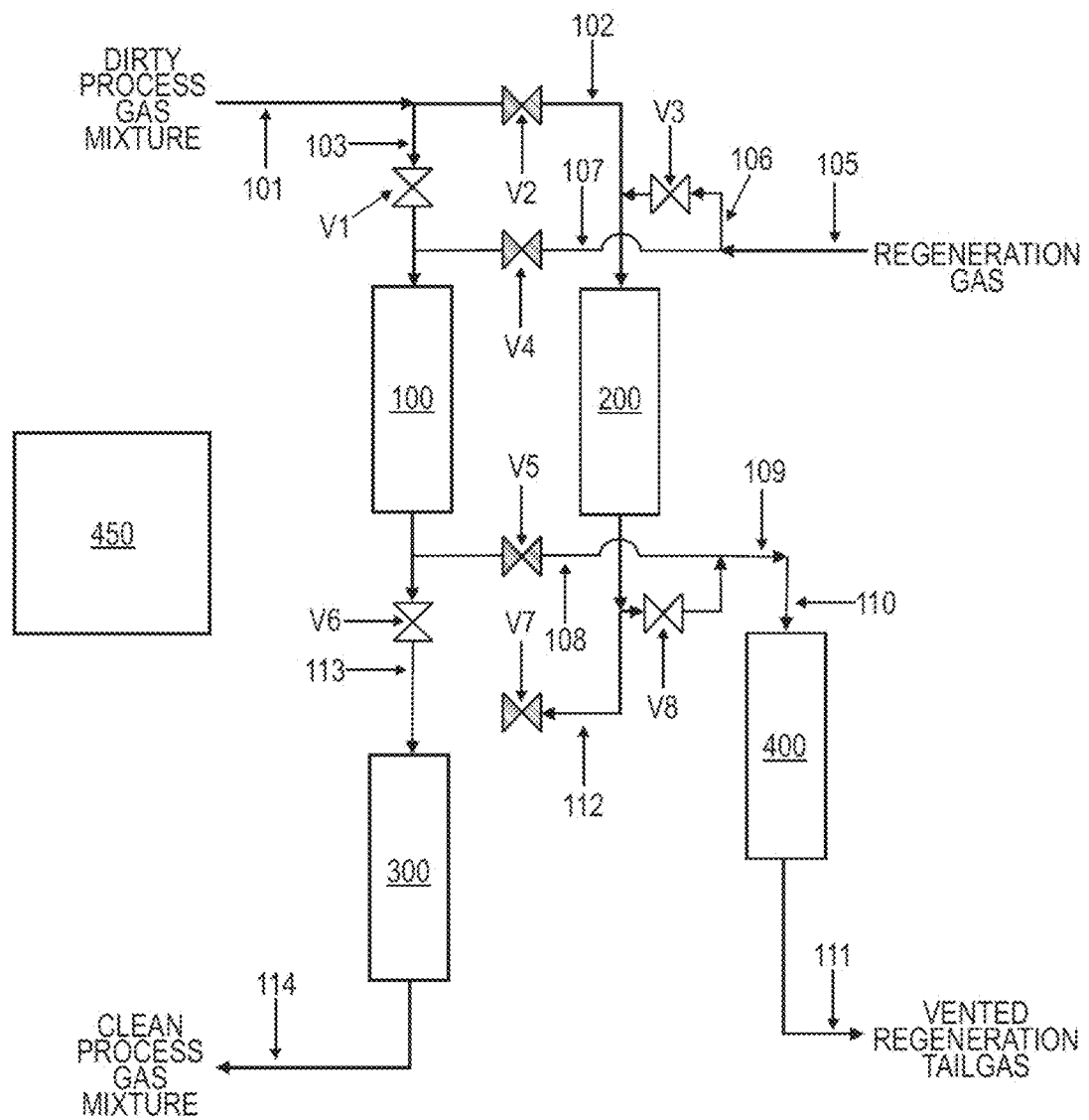
FIG. 1 is a process flow diagram illustrating a desulfurization system according to one embodiment of the present disclosure.

The present disclosure relates to a process and apparatus for the removal of hydrogen sulfide, carbonyl sulfide, carbon disulfide, and/or thiols and disulfides with four or less carbon atoms, from gas mixtures containing same, and to a process and apparatus for regeneration of regenerable sorbents.

The disclosure, as variously set out herein in respect of features, aspects and embodiments thereof, may in particular implementations be constituted as comprising, consisting, or consisting essentially of, some or all of such features, aspects and embodiments, as well as elements and components thereof being aggregated to constitute various further implementations of the disclosure. The disclosure is set out herein in various embodiments, and with reference to various features and aspects of the disclosure. The disclosure contemplates such features, aspects and embodiments in various permutations and combinations, as being within the scope of the invention. The disclosure may therefore be specified as comprising, consisting or consisting essentially of, any of such combinations and permutations of these specific features, aspects and embodiments, or a selected one or ones thereof.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the disclosure. The upper and lower limits of these smaller ranges may independently be included or excluded in the range, and each range where either, neither or both limits are included in the smaller ranges is also encompassed within the disclosure, subject to any specifically excluded limit in the stated range. Where the stated range includes one or both of the limits, ranges excluding either or both of those included limits are also included in the disclosure.

As used herein, and in the appended claims, the singular forms "a", "and", and "the" include plural referents unless the context clearly dictates otherwise.

As used herein, and in the appended claims, the term "about" in reference to a specified numerical value refers to included variations of ±10% from such specified numerical value.

As used herein, and in the appended claims, "thiols and disulfides with four or less carbon atoms" refers to thiols with one, two, three, four, or no carbon atoms, and to disulfides with one, two, three, four, or no carbon atoms, respectively. Such thiols may include, by way of example, $C_1$-$C_4$ alkylthiols such as methanethiol ($CH_3SH$), ethanethiol ($C_2H_5SH$), propanethiol ($C_3H_7SH$), and butanethiol ($C_4H_9SH$), as well as other $C_1$-$C_4$ organothiols. Such disulfides may include, by way of example, $C_1$-$C_4$ disulfides, e.g., carbon disulfide ($CS_2$), and disulfide compounds of the formula R—S—S—R' wherein R and R' are organo moieties that together (R+R') include from 1 to 4 carbon atoms. These disulfides of the formula R—S—S—R' may for example include dimethyl disulfide ($CH_3SSCH_3$) and diethyl disulfide ($C_2H_5SSC_2H_5$).

In all chemical formulae herein, a range of carbon numbers will be regarded as specifying a sequence of consecutive alternative carbon-containing moieties, including all moieties containing numbers of carbon atoms intermediate the endpoint values of carbon number in the specific range as well as moieties containing numbers of carbon atoms equal to an endpoint value of the specific range, e.g., $C_1$-$C_4$, is inclusive of $C_1$, $C_2$, $C_3$, and $C_4$, and each of such broader ranges may be further limitingly specified with reference to carbon numbers within such ranges, as sub-ranges thereof. Thus, for example, the range $C_1$-$C_4$ would be inclusive of and can be further limited by specification of sub-ranges such as $C_1$-$C_3$, $C_2$-$C_4$, $C_1$-$C_2$, and $C_3$-$C_4$ within the scope of the broader range.

Thus, the identification of a carbon number range, e.g., in $C_1$-$C_4$, is intended to include each of the component carbon number moieties within such range, so that each intervening carbon number and any other stated or intervening carbon number value in that stated range, is encompassed, it being further understood that sub-ranges of carbon number within specified carbon number ranges may independently be included in smaller carbon number ranges, within the scope of the disclosure, and that ranges of carbon numbers specifically excluding a carbon number or numbers are included in the disclosure, and sub-ranges excluding either or both of carbon number limits of specified ranges are also included in the disclosure. Accordingly, $C_1$-$C_4$ alkyl is intended to include methyl, ethyl, propyl, and butyl, including straight chain as well as branched groups of such types.

The same construction and selection flexibility is applicable to stoichiometric coefficients and numerical values specifying the number of atoms, functional groups, ions or moieties, as to specified ranges, numerical value constraints (e.g., inequalities, greater than, less than constraints), as well as other variables determinative of the specific form, state, and composition applicable to sorbents and other chemical entities within the broad scope of the present disclosure.

"Organo moieties" as referred to herein may be of any suitable type, and may for example comprise alkyl, aryl, cycloalkyl, or other organo moieties.

As used herein, the term "$C_1$-$C_4$ alkyl" includes methyl, ethyl, propyl, isopropyl, butyl, s-butyl, and t-butyl.

As used herein, the term "ppmv" in reference to a component of a material, e.g., a gas species in a gas mixture, refers to parts per million by volume, based on volume of the material. Correspondingly, as used herein, the term "ppbv" in reference to a component of a material, e.g., a gas species in a gas mixture, refers to parts per billion by volume, based on volume of the material.

Unless defined otherwise, all technical and scientific terms used herein have the same meaning as commonly understood by one of ordinary skill in the art in the field of the present disclosure.

Various embodiments herein describe a continuous desulfurization process that reduces the cost of sulfur removal as compared to conventional sulfur guard bed materials and as compared to chemical or physical solvents processes, in gas mixtures containing from about 5 ppmv to about 5,000 ppmv of sulfur.

In one aspect, the present disclosure relates to a continuous operation desulfurization system for desulfurizing a gas stream containing reduced sulfur species at concentration in a range of from about 5 to about 5000 ppmv, wherein said reduced sulfur species is hydrogen sulfide ($H_2S$), carbonyl sulfide (COS), carbon disulfide ($CS_2$), thiol with four or less carbon atoms, disulfide with four or less carbon atoms, or a mixture of two or more of the foregoing reduced sulfur species, said system comprising: at least two primary adsorbent beds of desulfurization sorbent selective for said reduced sulfur species, constructed and arranged in relation to one another so that each of said adsorbent beds in operation undergoes a cyclic alternating and repeating sequence of (i) onstream desulfurization operation including contacting of said gas stream with the sorbent in the sorbent bed to produce a sulfur-reduced gas stream, and (ii) offstream regeneration operation including (a) contacting the sorbent in the sorbent bed with oxygen-containing regeneration gas to remove adsorbed sulfur species to produce a sulfur dioxide-containing regeneration gas, and optionally one or both of (b) heating of the sorbent in the sorbent bed and (c) purging of the adsorbent bed; a sulfur dioxide conversion unit constructed and arranged to process the sulfur dioxide-containing regeneration gas to remove sulfur dioxide therefrom and produce sulfur dioxide-depleted regeneration vent gas; valved flow circuitry constructed and arranged to selectively: (1) connect an onstream one of said at least two adsorbent beds of desulfurization sorbent in gas-receiving relationship with a source of the gas stream containing reduced sulfur species; (2) connect an offstream one of said at least two adsorbent beds of desulfurization sorbent in gas-receiving relationship with a source of the oxygen-containing regeneration gas; (3) flow the sulfur dioxide-containing regeneration gas from the offstream one of said at least two adsorbent beds of desulfurization sorbent to said sulfur dioxide conversion unit, and discharge sulfur dioxide-depleted regeneration vent gas from said sulfur dioxide conversion unit; and a controller constructed and arranged to operate valves of the valved flow circuitry in response to at least one of (A) a monitored system operating condition, and (B) a cycle time program, so that each one of said at least two adsorbent beds of desulfurization sorbent cyclically, alternatingly and repetitively undergoes said sequence of (i) onstream desulfurization operation and (ii) offstream regeneration operation, in the continuous operation of the system.

Such continuous operation desulfurization system may be variously constituted, arranged, and operated to encompass any one or more of the following compatible aspects, features, and embodiments:

the at least two primary adsorbent beds of desulfurization sorbent contain a transition metal oxide desulfurization sorbent as the sorbent in said primary adsorbent beds;

the at least two primary adsorbent beds of desulfurization sorbent contain a metal oxide desulfurization sorbent whose metal includes one or more than one of zinc, nickel, manganese, copper, iron, tin, cobalt, vanadium, and chromium, as the sorbent in said primary adsorbent beds;

the at least two primary adsorbent beds of desulfurization sorbent contain a metal oxide desulfurization sorbent having a pore volume of from 0.2 to 0.6 cc/g, BET surface area of from 10 to 100 $m^2$/g, and crush strength of from 5 to 15 lbs/mm, as the sorbent in said primary adsorbent beds;

the at least two primary adsorbent beds of desulfurization sorbent contain a metal oxide desulfurization sorbent as the sorbent in said primary adsorbent beds, wherein said metal oxide desulfurization sorbent reacts with said reduced sulfur species to form regenerable metal sulfide;

the at least two primary adsorbent beds of desulfurization sorbent contain a metal oxide desulfurization sorbent as the sorbent in said primary adsorbent beds, and said metal oxide desulfurization sorbent in said primary adsorbent beds maintains substantially stable dynamic sulfur capacity for at least 100 regeneration cycles;

said sorbent in said primary adsorbent beds includes zinc oxide;

said source of the oxygen-containing regeneration gas includes oxygen-containing regeneration gas containing from 1% by volume to 15% by volume oxygen, based on volume of the oxygen-containing regeneration gas;

the sulfur dioxide conversion unit converts sulfur dioxide in said sulfur dioxide-containing regeneration gas to one or more of sulfuric acid, sodium sulfite/sulfate, calcium sulfite/sulfate, magnesium sulfite/sulfate, ammonium sulfite/sulfate, and elemental sulfur;

the sulfur dioxide conversion unit comprises a flue gas treatment unit reacting sulfur dioxide in said sulfur dioxide-containing regeneration gas with one or more reactants selected from alkali and alkali earth oxides, hydroxides, carbonates, and bicarbonates;

said one or more reactants are selected from sodium oxide, potassium oxide, calcium oxide, and magnesium oxide;

the controller is constructed and arranged to operate valves of the valved flow circuitry in response to at least one monitored system operating condition;

the at least one monitored system operating condition includes a temperature, pressure, flow rate, or composition;

the controller is operatively linked with sensor(s) of the at least one monitored system operating condition;

the controller is wirelessly operatively linked with the sensor(s);

the controller is operatively linked with the sensor(s) by signal transmission lines;

the controller is constructed and arranged to operate valves of the valved flow circuitry in response to a cycle time program;

the controller is constructed and arranged to operate valves of the valved flow circuitry in response to the controller's determination of one of (a) a monitored system operating condition, and (b) a cycle time program, as being controlling;

the controller is operatively linked with one or more heater and thermal monitoring equipment to operate the system at predetermined temperature;

the controller is operatively linked with one or more heater and thermal monitoring equipment to operate the system at temperature in a range of from 315° C. (600° F.) to 593° C. (1100° F.);

further comprising at least one guard bed of desulfurization sorbent selective for the reduced sulfur species, constructed and arranged to contact the sulfur-reduced gas stream with the guard bed desulfurization sorbent to produce a sulfur-depleted gas stream;

the guard bed desulfurization sorbent includes at least one of zinc oxide and alumina;

the sorbent in said primary adsorbent beds includes one or more of metal oxides and/or metal salts, wherein the metal thereof includes one or more of zinc, manganese, copper, iron, and chromium;

said metal salts include one or more of metal acetates, metal formates, metal carbonates, and metal nitrates;

further comprising a compressor constructed and arranged to draw air from the atmosphere to produce a compressed air stream, and an oxygen-selective membrane module constructed and arranged to receive the compressed air stream from the compressor, to produce an oxygen-reduced regeneration gas as said oxygen-containing regeneration gas for the offstream regeneration operation;

further comprising: a compressor constructed and arranged to draw air from the atmosphere to produce a compressed air stream; an oxygen-selective membrane module constructed and arranged to receive the compressed air stream from the compressor, to produce an oxygen-reduced gas stream; and an oxygen reactor constructed and arranged to receive fuel from a fuel source and to receive the oxygen-reduced gas stream produced by the oxygen-selective membrane module, to produce an oxygen-depleted nitrogen-based inert gas for use in purging of the offstream adsorbent bed in the offstream regeneration operation;

the oxygen reactor is constructed and arranged to produce said oxygen-depleted nitrogen-based inert gas, with an oxygen concentration less than 0.1 ppmv; and the system is constructed and arranged to produce said sulfur-depleted gas stream containing reduced sulfur species at concentration below 1000 ppbv.

In another aspect, the present disclosure relates to a continuous operation desulfurization process for desulfurizing a gas stream containing reduced sulfur species at concentration in a range of from about 5 to about 5000 ppmv, wherein said reduced sulfur species is hydrogen sulfide ($H_2S$), carbonyl sulfide (COS), carbon disulfide ($CS_2$), thiol with four or less carbon atoms, disulfide with four or less carbon atoms, or a mixture of two or more of the foregoing reduced sulfur species, said process comprising: providing at least two primary adsorbent beds of desulfurization sorbent selective for said reduced sulfur species, constructed and arranged in relation to one another so that each of said adsorbent beds in operation undergoes a cyclic alternating and repeating sequence of (i) onstream desulfurization operation including contacting of said gas stream with the sorbent in the sorbent bed to produce a sulfur-reduced gas stream, and (ii) offstream regeneration operation including (a) contacting the sorbent in the sorbent bed with an oxygen-containing regeneration gas to remove adsorbed sulfur species to produce a sulfur dioxide-containing regeneration gas, and optionally one or both of (b) heating of the sorbent in the sorbent bed and (c) purging of the adsorbent bed; contacting the gas stream with the sorbent in the sorbent bed of an onstream one of said at least two primary adsorbent beds, to produce the sulfur-reduced gas stream; during said contacting of the gas stream with the sorbent in the sorbent bed of the onstream one of said at least two primary adsorbent beds, regenerating an offstream one of said at least two primary adsorbent beds by contacting the sorbent in the offstream adsorbent bed with the oxygen-containing regeneration gas, to produce the sulfur dioxide-containing regeneration gas, and optionally performing at least one of heating and purging of the offstream adsorbent bed in said regenerating; processing the sulfur dioxide-containing regeneration gas to remove sulfur dioxide therefrom and produce sulfur dioxide-depleted regeneration vent gas; and controlling the process in response to at least one of (A) a monitored system operating condition, and (B) a cycle time program, so that each one of said at least two adsorbent beds of desulfurization sorbent cyclically, alternatingly and repetitively undergoes said sequence of (i) onstream desulfurization operation and (ii) offstream regeneration operation, in the continuous operation of the process.

Such process may be variously constituted, arranged, and performed to encompass any one or more of the following compatible aspects, features, and embodiments:

the at least two primary adsorbent beds of desulfurization sorbent contain a transition metal oxide desulfurization sorbent as the sorbent in said primary adsorbent beds;

the at least two primary adsorbent beds of desulfurization sorbent contain a metal oxide desulfurization sorbent whose metal includes one or more than one of zinc, nickel, manganese, copper, iron, tin, cobalt, vanadium, and chromium, as the sorbent in said primary adsorbent beds;

the at least two primary adsorbent beds of desulfurization sorbent contain a metal oxide desulfurization sorbent having a pore volume of from 0.2 to 0.6 cc/g, BET surface area of from 10 to 100 $m^2/g$, and crush strength of from 5 to 15 lbs/mm, as the sorbent in said primary adsorbent beds;

the at least two primary adsorbent beds of desulfurization sorbent contain a metal oxide desulfurization sorbent as the sorbent in said primary adsorbent beds, wherein said metal oxide desulfurization sorbent reacts with said reduced sulfur species to form regenerable metal sulfide;

the at least two primary adsorbent beds of desulfurization sorbent contain a metal oxide desulfurization sorbent as the sorbent in said primary adsorbent beds, and said metal oxide desulfurization sorbent in said primary adsorbent beds maintains substantially stable dynamic sulfur capacity for at least 100 regeneration cycles;

said sorbent in said primary adsorbent beds includes zinc oxide;

the oxygen-containing regeneration gas contains from 1% by volume to 15% by volume oxygen, based on volume of the oxygen-containing regeneration gas;

converting sulfur dioxide in said sulfur dioxide-containing regeneration gas to one or more of sulfuric acid, sodium sulfite/sulfate, calcium sulfite/sulfate, magnesium sulfite/sulfate, ammonium sulfite/sulfate, and elemental sulfur;

reacting sulfur dioxide in said sulfur dioxide-containing regeneration gas with one or more reactants selected from alkali and alkali earth oxides, hydroxides, carbonates, and bicarbonates;

said one or more reactants are selected from sodium oxide, potassium oxide, calcium oxide, and magnesium oxide;

said controlling includes operating valves of valved flow circuitry in a process system constructed and arranged to perform the process, in response to at least one monitored system operating condition;

the at least one monitored system operating condition includes a temperature, pressure, flow rate, or composition;

said controlling is responsive to monitoring of at least one system operating condition;

said controlling includes operating valves of valved flow circuitry in a process system constructed and arranged to perform the process, in response to a cycle time program;

said controlling includes operating valves of valved flow circuitry in a process system constructed and arranged to perform the process, in response to a determined controlling one of (a) a monitored system operating condition, and (b) a cycle time program;

said controlling includes operating the system at predetermined temperature;

said predetermined temperature is in a range of from 315° C. (600° F.) to 593° C. (1100° F.);

contacting the sulfur-reduced gas stream from an onstream one of the at least two primary adsorbent beds with desulfurization sorbent in at least one guard bed, to produce a sulfur-depleted gas stream;

the guard bed desulfurization sorbent includes zinc oxide or alumina;

the sorbent in said primary adsorbent beds includes one or more of metal oxides and/or metal salts, wherein the metal thereof includes one or more of zinc, manganese, copper, iron, and chromium;

said metal salts include one or more of metal acetates, metal formates, metal carbonates, and metal nitrates;

further comprising compressing air from the atmosphere to produce a compressed air stream, and separating the compressed air stream by contact with an oxygen-selective membrane module, to produce an oxygen-reduced regeneration gas as said oxygen-containing regeneration gas for the offstream regeneration operation;

further comprising compressing air from the atmosphere to produce a compressed air stream, and separating the compressed air stream by contact with an oxygen-selective membrane module, to produce an oxygen-reduced gas stream, and reacting a fuel with the oxygen-reduced gas stream to produce an oxygen-depleted nitrogen-based inert gas for purging of the offstream adsorbent bed in the offstream regeneration operation;

said reacting is conducted to produce said oxygen-depleted nitrogen-based inert gas, with an oxygen concentration less than 0.1 ppmv;

the process is performed to produce said sulfur-depleted gas stream containing reduced sulfur species at concentration below 1000 ppbv;

said regenerating an offstream one of said at least two primary adsorbent beds by contacting the sorbent in the offstream adsorbent bed with the oxygen-containing regeneration gas is performed at a gas hourly space velocity of less than 2,500 h$^{-1}$ at standard temperature (0° C.) and pressure (1 atm) (STP) conditions; and said regenerating an offstream one of said at least two primary adsorbent beds by contacting the sorbent in the offstream adsorbent bed with the oxygen-containing regeneration gas is performed at a gas hourly space velocity in a range of from 500 h$^{-1}$ to 1500 h$^{-1}$ at standard temperature (0° C.) and pressure (1 atm) (STP) conditions.

A further aspect of the present disclosure relates to a continuous operation desulfurization process for desulfurizing a gas stream containing reduced sulfur species at concentration in a range of from about 5 to about 5000 ppmv, wherein said reduced sulfur species is hydrogen sulfide ($H_2S$), carbonyl sulfide (COS), carbon disulfide ($CS_2$), thiol with four or less carbon atoms, disulfide with four or less carbon atoms, or a mixture of two or more of the foregoing reduced sulfur species, said process comprising operation of the continuous operation desulfurization system as variously described hereinabove.

Referring now to the drawings, FIG. 1 is a process flow diagram illustrating a two-bed desulfurization process system 10 according to one embodiment of the present disclosure. In FIG. 1, the flow path of a process flow gas and a regenerating gas are controlled by a plurality of valves, arranged as shown. In FIG. 1, the open state of a valve is depicted by an unfilled outline of the valve symbol  and the closed state of a valve is depicted by a solid filled valve symbol . Individual valves are identified by the letter 'v' followed by a number. Based on the state of the valves illustrated in FIG. 1, the process gas mixture to be treated enters the process through process gas mixture feed line 101. It follows a path through branch feed line 103 containing open valve V1, to the first primary adsorbent bed 100, from which sulfur-reduced process gas flows in sulfur-reduced process gas discharge line 113, with valve V6 being open, to the guard bed 300, from which sulfur-depleted process gas is discharged in sulfur-depleted process gas discharge line 114 as a clean process gas mixture. The guard bed is an optional system component, and may comprise any suitable guard bed sorbent, such as non-regenerable zinc oxide sorbent, alumina sorbent, or the like. It will be appreciated that numerous types of guard bed sorbents may be employed in disposable guard beds that are utilized to further remove reduced sulfur species from the sulfur-reduced gas produced by an onstream one of the primary adsorbent beds, to produce sulfur-depleted gas from the system that may be processed in downstream processing apparatus and operations. The regeneration gas enters the process system 10 in regeneration gas feed line 105, flowing in regeneration gas branch feed line 106 containing open valve V3 through branch feed line 102 to the second primary adsorbent bed 200, from which the sorbate-containing regeneration gas is flowed in line 112 via the branch line containing open valve V8 to the desorbed gas branch feed line 109 to desorbed gas feed line 110 and into the sulfur dioxide conversion unit 400, from which regeneration vent gas is discharged in regeneration vent gas discharge line 111 from the system.

FIG. 1 thus shows the desulfurization process system 10 in a first stage of continuous operation, in which the first primary adsorbent bed is on-stream, actively processing the influent process gas mixture to the system to produce sulfur-reduced process gas that then is further depleted of sulfur in the optional guard bed 300, producing a sulfur-depleted process gas that is discharged from the system. During such on-stream operation of first primary adsorbent bed 100, the second primary adsorbent bed 200 is undergoing regeneration, with regeneration gas being flowed through the second primary adsorbent bed 200 to effect desorption of previously adsorbed sulfur, with discharge of desorbate-containing regeneration gas in which the sulfur is in the form of sulfur dioxide, and processing of such desorbate-containing regeneration gas in the sulfur dioxide conversion unit 400 to yield sulfur dioxide-derived products, and discharge of regeneration vent gas from the system.

Thus, as the process gas flows through the process system, it enters the first primary adsorbent bed 100, which contains a regenerate sorbent capable of adsorbing sulfur. The regenerate sorbent is a metal oxide sorbent, in which the metal may be of any suitable type or types (single metal or multimetal oxides) e.g., including zinc, nickel, manganese, copper, iron, or tin, or compatible combinations of two or more of such metals, or mixtures of one or more of such metals with other metals. Because the active metal oxide in the sorbent in the first primary adsorbent bed 100 is present as a metal oxide and not a metal sulfide, it removes the sulfur present in the process gas mixture as the process gas mixture flows through such fixed bed. The sulfur is removed through the conversion of the metal oxide into a sulfide for $H_2S$, COS, $CS_2$, and thiols and disulfides with less than four carbon atoms. The treated process gas leaving the first primary adsorbent bed 100 has lower reduced sulfur species concentrations than the untreated process gas. After leaving the first primary adsorbent bed 100, the process gas flows into guard bed 300. Guard bed 300 is a fixed bed, which has a non-regenerable sorbent for removing sulfur, such as zinc oxide, iron oxide, or other reduced sulfur species-selective guard bed adsorbent. Guard bed 300 protects downstream processes from the adverse effects of reduced sulfur species in the event of a process upset and effectively reduces the sulfur concentration of the reduced sulfur species remaining in the process gas to ppbv levels, i.e., at concentration below 1000 ppbv, preferably below 500 ppbv, and most preferably below 100 ppbv. At the ppbv sulfur concentrations, any catalyst poisoning in downstream processes by reduced sulfur species occurs at a commercially acceptable rate.

The regeneration gas, which contains oxygen, enters the process system through regeneration gas feed line 105 and branch feed line 102, flowing into second primary adsorbent bed 200. The regenerable sorbent in second primary adsorbent bed 200 at the inception of regeneration is sulfided. The active sulfur removal component has been sulfided in prior on-stream adsorption operation, and cannot remove any additional sulfur from a process gas mixture without being regenerated. In fixed second primary adsorbent bed 200, the oxygen in the regenerating gas reacts with the sulfided sorbent according to the reaction $Me_xS_y + 1.5y\ O_2 = Me_xO_y + ySO_2$. In this reaction, Me is a suitable metal, and x and y are the stoichiometric coefficients. In case of ZnO as an active metal oxide in the sorbent, Me will be Zn, and x=1 and y=1. The effluent gas from the second primary adsorbent bed 200 being regenerated, which contains $SO_2$, leaves such fixed bed, leaving behind a regenerated sorbent with active metal oxide, which is capable of removing sulfur from a process gas in the subsequent cycle of operation.

After leaving fixed bed 200, the regenerated gas containing $SO_2$ is sent in desorbed gas branch feed line 109 and desorbed gas feed line 110 to the sulfur dioxide conversion unit 400 that effectively converts this $SO_2$ to an acceptable product form for sale or for safe disposition. The sulfur dioxide conversion unit 400 can embody any of different available commercial technologies, which convert the $SO_2$ into sulfuric acid, sodium sulfite/sulfate, calcium sulfite/sulfate, magnesium sulfite/sulfate, ammonium sulfite/sulfate, or elemental sulfur, or the like. Alternatively, this $SO_2$-containing stream can also be treated in a flue gas treatment unit using desulfurization agents primarily comprised of any of alkali and alkali earth oxides, hydroxides, carbonates, bicarbonates, or other agents that rapidly react with $SO_2$. Preferred alkali metals include sodium and potassium, while preferred alkali earth metals include calcium and magnesium. The treated gas leaving sulfur dioxide conversion unit 400 as regeneration vent gas has a sulfur concentration that can be legally released to the atmosphere because its $SO_2$ concentration is below the regulated sulfur emission concentration.

FIG. 1 shows valves V2, V4, V5, and V7 in a closed position. In this closed position, valves V2 and V7 stop flow of the process gas mixture, which is reducing, into the regenerating second primary adsorbent bed 200 or its associated flow path, which contains oxidizing gases. Valves V4 and V5 stop the regeneration gas mixture, which is oxidizing, from entering fixed-bed 100 and its associated flow path containing process gas mixture which is reducing.

As the sorbent in first primary adsorbent bed 100 becomes saturated with sulfur with time, the effluent concentration of sulfur will rise in sulfur-reduced process gas discharge line 113. When the sulfur concentration in line 113 reaches a predetermined or set point sulfur concentration level, the valve positions shown in FIG. 1 will be reversed. By reversing the valve position, which switches open valves to closed and vice versa, the streams flowing into fixed beds 100 and 200 are switched. Regeneration gas then flows from regeneration gas feed line 105 to regeneration gas branch feed line 107, with valve V4 switched to an open state, passing into first primary adsorbent bed 100, with the resulting desorbate-containing regeneration gas flowing into desorbed gas branch feed line 108 and desorbed gas branch feed line 109 and desorbed gas feed line 110 to the sulfur dioxide conversion unit 400, valve V5 being open during such operation. At the same time, the process gas mixture flows into second primary adsorbent bed 200 through branch feed line 102, with valve V2 being open, and the sulfur-reduced process gas is discharged from bed 200 in sulfur-reduced process gas discharge line 112, valve V7 being open so that the sulfur-reduced process gas flows in line 112 to guard bed 300, with the sulfur-depleted process gas, in which the concentration of reduced sulfur species is at the ppbv level, is discharged from the system in sulfur-depleted process gas discharge line 114.

According to one embodiment herein, combined with this hardware is a functional process scheme that allows the switching of the valving, directing gas between these different reactors resulting in the continuous production of a desulfurized process gas. Of specific importance is the regeneration process sequence, since it enables effectively managing the regeneration reaction rate, temperature rise due to the exothermic reaction, and transient process nature to achieve effective conversion of the metal sulfide component back into active metal oxide component while minimizing any side reactions and completing this in a timeframe that supports the timing that makes the entire process work over a large number of desulfurization and regeneration cycles.

Thus, FIG. 1 schematically and illustratively depicts valved flow circuitry including valves V1, V2, V3, V4, V5, V6, V7, and V8, and a controller 450 that is constructed and arranged to operate valves of the valved flow circuitry in response to at least one of (A) a monitored system operating condition, and (B) a cycle time program, so that each one of the adsorbent beds of desulfurization sorbent cyclically, alternatingly and repetitively undergoes a sequence of (i) onstream desulfurization operation and (ii) offstream regeneration operation, in the continuous operation of the system, wherein the offstream regeneration operation includes (a) contacting the sorbent in the sorbent bed with oxygen-containing regeneration gas to remove adsorbed sulfur species to produce a sulfur dioxide-containing regeneration gas, and optionally one or both of (b) heating of the sorbent in the sorbent bed and (c) purging of the adsorbent bed. For such purpose, the controller 450 may be coupled in controlling relationship with the valves V1, V2, V3, V4, V5, V6, V7, and V8 by wireless valve actuators responsive to the controller, or alternatively by signal transmission lines (not shown in FIG. 1) interconnecting the controller with valve actuators of such valves, or in any other suitable manner or arrangement. The controller 450 may include one or more microprocessors, programmed or programmable logic devices, one or more programmed or programmable computers, or any other assembly or device that selectively operates the valves to carry out the continuous process of the system illustratively shown in FIG. 1. The valves may be of any suitable type, and may for example include pneumatic valves, solenoid valves, or other automatic valves.

The controller 450 may also incorporate or be coupled with sensors or monitoring devices that detect one or more process conditions in the process system, to which the controller responsively actuates the appropriate valves to effectuate the continuous desulfurization and regeneration operations in the system, in the respective beds. Such sensors or monitoring devices may for example include thermal monitoring devices sensing temperature, chemical and compositional sensors monitoring concentration(s), pressure sensors monitoring system pressure levels, flow monitoring or totalizer devices monitoring dynamic or cumulative flows of gas in the system, or any other sensors, detectors, monitors, analyzers, and the like, which communicate system condition variables to the controller for responsive operation of the valves and other components in the system.

The controller may therefore be constructed and arranged to effect changeover of a sorbent bed operation from onstream desulfurization operation to offstream regeneration operation, as well as sequencing of the regeneration steps of (1) regeneration gas contacting of the sulfide-loaded sorbent, and optionally one or both of (2) heating of the offstream adsorbent bed and (3) purging of the offstream adsorbent bed, in response to the sensed or monitored process system conditions. Alternatively, or additionally, the controller may be constructed and arranged to effect the changeover and sequencing of the regeneration steps in response to a cycle timer program incorporated in or communicated to the controller. When the controller is constructed and arranged to effect the changeover and sequencing of regeneration steps by both response to sensed or monitored process system conditions and response to a cycle timer program, the controller may be programmatically arranged to determine which of such changeover- and sequencing-modulating modalities will take priority and govern the performance of the changeover and regeneration sequence steps.

In the regeneration sequence steps, an additional standby step may be provided and employed to accommodate the cycle times of desulfurization and regeneration operations, so that for example when the regeneration operation is concluded more quickly than the desulfurization operation in the onstream adsorbent bed, the regenerated adsorbent bed is maintained in standby condition until changeover when the regenerated adsorbent bed is placed onstream.

It will therefore be appreciated that the respective cycle times may be varied in connection with variable process system components, arrangements, and operations, so that the controller maintains continuity of onstream desulfurization operation of at least one of the at least two adsorbent beds in the system. In such respect, it will also be appreciated that the process system may deploy any suitable number of adsorbent beds. The adsorbent beds may be deployed in adsorber vessels of any suitable construction, in which the adsorbent bed of sorbent material is fixedly positioned for flow of the various process gas streams (including desulfurization streams and regeneration streams) therethrough.

According to one embodiment herein, the desulfurization process is operated at a temperature in a range of from 315° C. (600° F.) to 593° C. (1100° F.), and a controller such as controller 450 shown in FIG. 1 may be operatively linked with one or mote heaters and thermal monitoring equipment to establish and maintain such temperature in the process system, e.g., in the primary adsorbent bed during onstream and regeneration operation.

According to one embodiment herein, a key requirement for continuous desulfurization of the process gas mixture is that when the sorbent in the desulfurizing fixed-bed becomes saturated indicating that active metal oxide has been substantially converted into metal sulfide, there is a freshly regenerated fixed-bed waiting to be switched over to start desulfurization. For a two-bed system, this requires that the total time required, for all of the steps required in the regeneration mode as detailed above, be less or at its maximum match the time required for the desulfurization cycle. If the total time for all the regeneration steps exceeds the time for desulfurization, additional fixed beds may be added with the total regeneration process spread across multiple beds until enough beds have been added so that one bed has completed the total regeneration process and is available for switchover and resumption of active on-stream operation of desulfurization when the current onstream bed engaged in desulfurization operation becomes saturated.

According to one embodiment herein, the regeneration includes a purge to replace the process gas mixture with an inert gas, e.g., an inert gas including nitrogen, steam, $CO_2$, or a mixture of two or more thereof, a heating step in which the sorbent in the regenerating fixed bed is heated to an appropriate regeneration temperature with an inert gas flow, introduction of a hot regeneration gas containing oxygen for converting the metal sulfide into metal oxide and $SO_2$, another purge stream to replace the regeneration gas with an inert gas, e.g., an inert gas including nitrogen, steam, $CO_2$, or a mixture of two or more thereof, cooling of the fixed bed back down to the appropriate desulfurization temperature, and in some instances, a reductive regeneration step where the oxidized sorbent is exposed to a reducing gas prior to starting the subsequent desulfurization operation.

According to one embodiment herein, controlling the regeneration reaction rate to ensure that sufficient reaction occurs to maintain optimal temperature at the reaction front as it travels through the fixed bed is critical to effective regeneration of the sorbent to achieve at least 100 desulfurization-regeneration cycles. The exothermic nature of the regeneration reaction provides the heat for the process as the regeneration reaction and heat generated in the process are controlled by the inlet flow rate of the regeneration gas and its oxygen concentration. The combination of these two operating parameters also sets the time required to effectively regenerate the sorbent.

According to one embodiment herein, the heating rate of the sorbent in preparation for regeneration must be carefully controlled so as not to damage the sorbent or refractory lining of the reactor, if refractory lining is being used, due to thermal shock or excessively rapid and non-uniform thermal expansion. The heating rate is a function of the heat transfer from the heating source to the regeneration gas. Because of the large thermal mass of the fixed bed, this heating process will be slow. In addition, acceptable heating rates for the sorbent and refractory lining for the reactor, if refractory lining is being used, will limit the maximum heating rate to about <42° C./h (<75° F./h)).

According to one embodiment herein, the specific goal of the purge steps is to replace the reactive gas with inert gas, preventing the mixing of the reducing gas from the desulfurization and the oxidation gas used for regeneration, in which the resulting mixture could become explosive. Such prevention of deleterious mixing may be accomplished with either linear purges or dynamic purges. In linear purges, a steady flow of gas at a constant pressure uses the inert purge gas to push the reactive gas out of the system. Dynamic purges use cyclic pressurization and depressurization of the system to effectively dilute any reactive gas out of the system with inert gas. Dynamic purges can be more rapid, if rapid pressurization and depressurization is acceptable. Dynamic purging is also more effective at removing reactive gases from dead spots in the fixed bed vessel.

According to one embodiment herein, the general approach for establishing the time for each regeneration step is to start with regeneration. The flow rate and oxygen concentration of the regeneration gas are carefully selected to achieve an acceptable regeneration rate, and to keep the maximum temperature in the fixed bed below 775° C. (1427° F.). These parameters help in identifying a suitable starting temperature for the regeneration reaction. With this temperature and the heating rate of the furnace, the time for heating the fixed bed sorbent is set. Finally, the purge steps are planned.

According to one embodiment herein, excess time is usually built into the purge steps, and especially the last purge before restarting desulfurization. In this manner, the regenerated sorbent bed is essentially sitting in standby mode, waiting for desulfurization in the active on-stream bed to finish. In addition, the initial purge of the reducing process gas can be coupled with the heating as the slow heating rate will enable purging of a majority of the reducing process gas prior to any substantial temperature increase. Similarly, any cooling of the sorbent bed can be incorporated into the final purge.

According to one embodiment herein, switching between the various steps could be done by time using a programmable logic controller (PLC) or other cycle time controller device. A second and preferred option is to make switches based on effluent output concentrations or operating parameters. For the purges, this would be a reduction below a predetermined or set point specific concentration of the reducing or oxidizing species. For heating or cooling, this would be achieving a set operating temperature. For regeneration, this would be reaching a set concentration of $SO_2$ and/or (>2 in the effluent gas. In this approach, each step reaches completion prior to starting the next step. Because of the flexibility built into the purge steps, minor fluctuations can be accommodated in the process without interrupting the continuous nature of the desulfurization process. The sorbent effectively reaches the end of its useful life when the dynamic sulfur capacity of the sorbent becomes small enough that the total time for all the regeneration steps exceeds the desulfurization time for the specific system as built.

According to one embodiment herein, specific ranges for the operating parameters for the regeneration steps are provided to ensure optimal conversion of the metal sulfide back into metal oxide. The operating parameters include the starting temperature for regeneration, the oxygen concentration and the flow rate of the regeneration gas. The selection of the operating parameters for a specific system is primarily aimed at limiting the maximum temperature reached in the sorbent bed during regeneration to avoid sintering and deactivation of the sorbent, to limit the heat input required to reach the starting temperature, to have the starting temperature high enough so that when the regeneration reaction starts, sufficient heat is released to sustain the regeneration reaction, to use oxygen concentration and flow rate to control the regeneration reaction rate and reaction heat generation, to maintain sorbent bed temperature, to inhibit premature oxygen breakthrough early in the regeneration, and finally to avoid excessively low or high temperatures where side reactions that result in sorbent deactivation can occur. A person ordinarily skilled in the art based on the disclosure herein will be able to effectively adjust the regeneration parameters within the following specified ranges to achieve the aforementioned goals.

According to one embodiment herein, the starting temperature range is from about 427° C. (800° F.) to about 650° C. (1200° F.), with the preferred range from about 482° C. (900° F.) to about 538° C. (1000° F.).

According to one embodiment herein, the oxygen concentrations range from about 1 mol % to about 10 mol %, and more preferably from about 2 mol % to about 7 mol %.

According to one embodiment herein, the regeneration flow rate should achieve a gas hourly space velocity<2,500 $h^{-1}$ at standard temperature (0° C.) and pressure (1 atm) (STP) conditions, and more preferably in a range of from 500 $h^{-1}$ to 1500 $h^{-1}$ at such conditions. The gas hourly space velocity is calculated by dividing the gas flow rate at STP conditions by the volume of the sorbent in the fixed bed.

According to one embodiment herein, the present invention can utilize any suitable fixed bed sorbents with known physical and chemical properties. These properties consist of pellet size and shape, pellet porosity (measured as pore volume and pore size distribution), surface area, density, and crush strength/attrition resistance, as physical properties. Desired chemical properties of such regenerable fixed bed sorbents include total sulfur absorption capacity, rate of sulfur absorption, rate of regeneration, dynamic sulfur capacity, and sorbent deactivation rate.

According to one embodiment herein, the regenerable fixed bed sorbents are generally based on zinc oxide and may further comprise other active metal oxides, binder materials, promoters, and the like. One example of this regenerable sorbent is described in U.S. Pat. Nos. 5,494,880; 5,866,503, and 5,703,003, the disclosures of all of which are incorporated herein by reference. The metal oxide sorbent may for example comprise any suitable metal or combination of metals, such as zinc, nickel, manganese, copper, iron, tin, cobalt, vanadium, chromium, or other suitable transition metals, or combinations of two or more of such metals.

According to one embodiment herein, specific physical properties required by a suitable regenerable sorbent include pore volume of from 0.2 to 0.6 cc/g, more preferably of from 0.3 to 0.5 cc/g, BET surface area of from 10 to 100 m$^2$/g, and crush strength of from 5 to 15 lbs/mm.

According to one embodiment herein, key chemical properties of the regenerable sorbent include maintaining dynamic sulfur capacity of between 60-80% of the theoretical sulfur capacity for the first one hundred cycles and reacting with COS, CS$_2$, and thiols and disulfides with less than four carbon atoms, to form a regenerable metal sulfide with reaction chemistry and reaction conditions analogous to those of H$_2$S.

According to one embodiment herein, sorbents with desired physical and chemical properties can be synthesized and manufactured at commercial scale using a process including mixing of zinc and alumina salt precursor solutions in a desired ratio, precipitating the cake using a precipitating agent, washing the cake to desired purity, drying the cake to a predetermined moisture level, pelletizing in a desired shape, and then calcining the pellets to make the final formulation to obtain the desired physical and chemical properties.

According to one embodiment herein, the process and system of the present disclosure also achieve removal of COS, CS$_2$, and thiols and disulfides with less than four carbon atoms, as well as H$_2$S, in this continuous desulfurization process in a very similar manner as described herein for H$_2$S. One specific example of application of such fixed bed sorbent process is treatment of a COS-containing tail gas from a Claus plant, which could be directly treated without the hydrolysis step.

According to one embodiment herein, the continuous fixed bed desulfurization process using a sorbent, which can be successfully regenerated for over 100 desulfurization/regeneration cycles is effective for removing sulfur at concentrations of 5 ppmv to 5,000 ppmv for gas streams at a lower cost and often with a more simplified process than competing commercial desulfurization processes.

According to one embodiment herein, application of a continuous fixed-bed desulfurization process for H$_2$S removal from the hydrogen recycle stream from hydrodesulfurization of the straight run fraction will eliminate the need for a caustic washing process, modifying any existing solvent-based desulfurization system processing the hydrogen for the heavier fractions, or a disposable sulfur guard bed and effectively reduce capital and operating costs while allowing this small process to be effectively tuned to maximize the profit generated from the refinery product slate.

According to one embodiment herein, the use of dedicated desulfurization and CO$_2$ removal systems in a natural gas sweetening process results in a significant reduction in process complexity and processing equipment, which is accompanied by a significant reduction in the capital equipment and operating costs for the overall natural gas sweetening process. This improvement for a dedicated sulfur removal process coupled with the lower capital and operating cost for a continuous regenerable fixed bed desulfurization process provides significant competitive advantage compared to existing commercial natural gas sweetening technologies.

According to one embodiment herein, the lower capital and operating costs for a continuous fixed bed desulfurization process, which can be effectively designed for high sulfur removal at small scale should be a cost-effective replacement for solvent-based desulfurization processes currently required to process Claus plant tail gas to meet required environmental sulfur emissions. The SO$_2$ generated during sorbent regeneration is easily recycled back to the Claus reactor which uses both H$_2$S and SO$_2$ as reactants to generate the elemental sulfur product according to the reaction, 2H$_2$S+SO$_2$=S$_2$+H$_2$O making integration of a continuous fixed bed desulfurization process easy and more cost effective.

Figure 2:
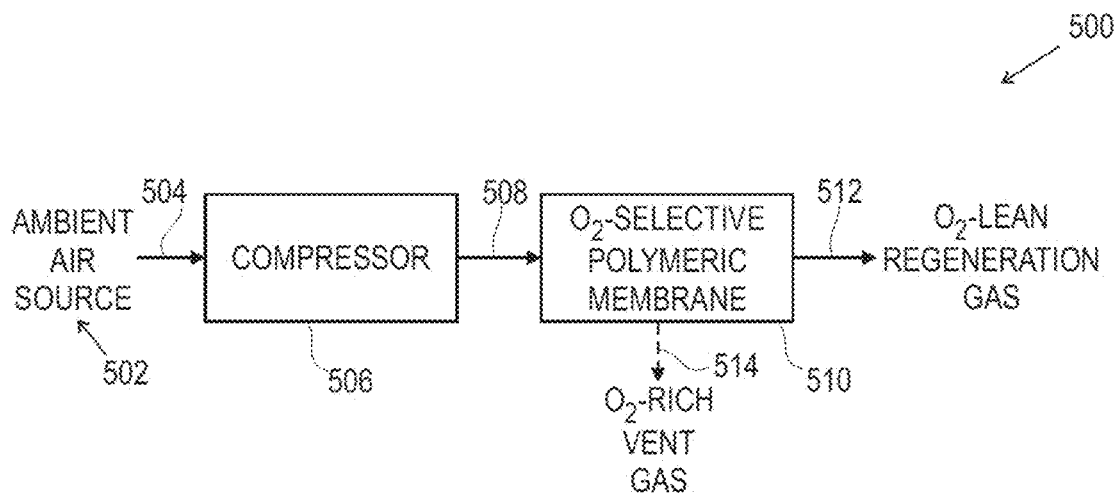
FIG. 2 is a process flow diagram for producing a low oxygen concentration regeneration gas, according to one embodiment of the present disclosure.

Various embodiments herein provide a process for producing an oxidizing gas mixtures suitable for regeneration of a fixed bed regenerable desulfurization sorbent. FIG. 2 shows a process flow diagram for the process system including a compressor and oxygen-selective polymeric membrane module. As illustrated, ambient air from an ambient air source 502 is flowed in ambient air feed line 504 to the compressor 506. The compressor may be arranged to pull air directly from the atmosphere and to compress the air to slightly above the operating pressure of the regeneration process. In a preferred embodiment, integrated with the compressor is a drying process that reduces the ambient humidity in the air as part of the compression process. During summer and in more humid regions, ambient air has a relatively large amount of water vapor, measured as humidity. Although such water vapor does not adversely impact the regeneration reactions, the resulting mixture of SO$_2$ generated from the oxidizing regeneration reaction and the water vapor or a highly corrosive mixture that can require exotic and expensive materials of construction for downstream equipment. By removing or at least significantly reducing the water vapor concentration in the compressed air, the resulting dry SO$_2$ and nitrogen is much less corrosive and allows the use of lower-cost materials of construction.

After drying and compression, the compressed dry air is flowed in feed line 508 to the membrane module 510 in which the compressed dry air is contacted with an oxygen-selective polymeric membrane. The oxygen-selective membrane favors transport of oxygen through the membrane as compared to nitrogen. The rate of each individual gas transfer across the membrane is driven by the different chemical potential on both sides of the membrane. The higher chemical potential of the compressed air results in the preferred transfer of oxygen across the membrane, generating an oxygen-rich low-pressure permeate stream that is discharged from the membrane module in permeate vent line 514 as oxygen-rich vent gas. The retentate stream, which is the residual gas stream that does not permeate through the membrane, has a reduced oxygen concentration. This retentate stream is also at approximately the same pressure as the original compressed air stream, and is discharged from the membrane module in retentate discharge line 512 as oxygen-lean (oxygen-reduced) regeneration gas. As will be appreciated by those skilled in the art, based on the disclosure herein, the specific configuration of the membrane module, including the number of stages and stage cut for these stages may be readily adapted to generate different oxygen concentrations in the retentate stream that will be used as the oxidizing gas for regeneration.

Figure 3:
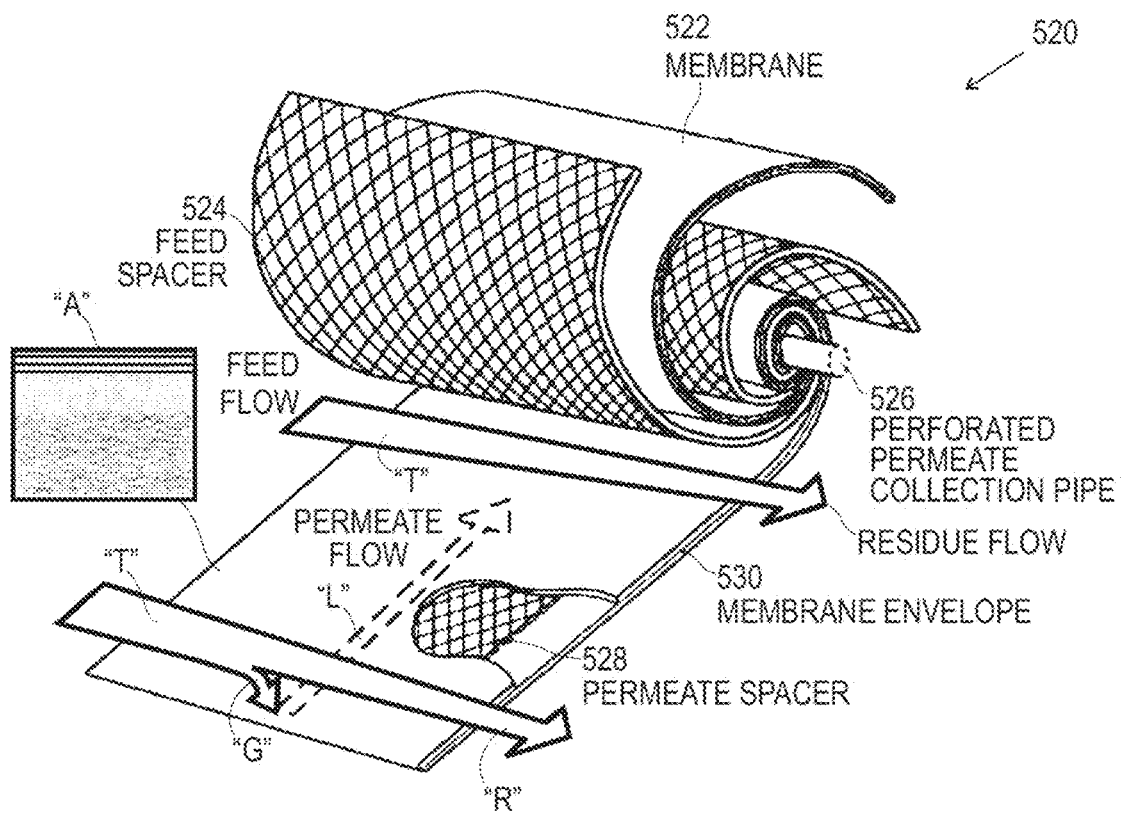
FIG. 3 is a schematic diagram illustrating the fabrication of a spiral wound membrane module, according to one embodiment of the present disclosure.

FIG. 3 is a schematic diagram illustrating the fabrication of a spiral wound membrane module, according to one embodiment of the present disclosure, which may be utilized in a membrane module of the type schematically depicted in FIG. 2. As illustrated, the spiral wound membrane 520 includes a membrane 522 and a spacer arrangement including a feed spacer 524 and a permeate spacer 528 that are with the membrane 522 provided in a membrane envelope 530 that is wound around a perforated permeate collection pipe 526. A cross-sectional elevation view of the sheet assembly including the spacer and membrane components is shown in the inset "A" in FIG. 3.

In operation of the membrane module 520, the gas mixture is flowed in the direction indicated by arrow "T" with the permeate passing through the membrane, as schematically depicted by branch arrow "G", and flowing in the direction indicated by dashed arrow "L" to the perforated permeate collection pipe 526, in which the oxygen-rich low-pressure permeate stream is discharged from the membrane module as oxygen-rich vent gas. The retentate passes in the direction indicated by arrow "R" and is discharged from the membrane module as oxygen-lean regeneration gas.

Figure 4:
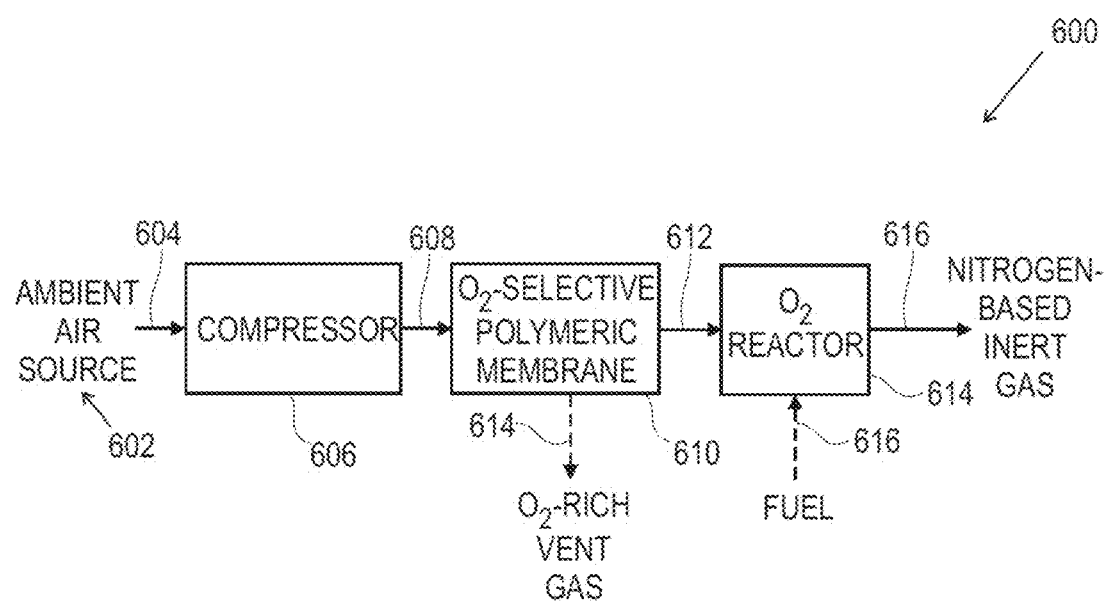
FIG. 4 is a process flow diagram for a process producing a nitrogen-based inert, according to one embodiment of the present disclosure.

FIG. 4 is a process flow diagram for a process producing a nitrogen-based inert, according to one embodiment of the present disclosure. Ambient air from an ambient air source 602, such as the atmosphere, is flowed in ambient air feed line 602 to compressor 606 and is compressed in the same manner as previously described in connection with FIG. 2, flowing in feed line 608 to the membrane module 610 in which the compressed dry air is contacted with an oxygen-selective polymeric membrane to generate an oxygen-rich low-pressure permeate stream that is discharged from the membrane module in permeate vent line 614 as oxygen-rich vent gas, and a retentate stream that is discharged from the membrane module in retentate discharge line 612 as oxygen-lean regeneration gas. From retentate discharge line 612, the oxygen-lean regeneration gas flows to oxygen reactor 614 to which fuel is introduced in fuel supply line 616 from a suitable fuel source. The reactor 614 contains an oxidation catalyst in the presence of which the fuel effects the consumption of the oxygen in the regeneration gas to a predetermined or set point level, e.g., <0.1 ppmv. As a result of the oxidizing reaction consuming the oxygen in the regeneration gas, the primary reaction products will be $CO_2$ and water vapor, resulting in an oxygen-depleted nitrogen-based inert gas that is discharged from the reactor 614 in inert gas discharge line 616.

According one embodiment of the present disclosure, the addition of a reactor to process the low oxygen concentration retentate stream from the membrane module allows production of a nitrogen-based inert mixture for purging in the fixed bed continuous desulfurization process using regenerable desulfurization sorbent.

Example 1

A fixed bed sorbent material manufactured by Clariant Corporation (Charlotte, N.C., USA) with trade name T-2716 was tested at the University of North Dakota Energy and Environmental Research Center (UNDEERC) in Grand Forks, N. Dak. A slipstream with a flow rate of 555 std. cubic feet per hour (SCFH) from UNDEERC's pilot-scale gasifier using Illinois #6 coal was sent to a fixed bed reactor that was loaded with 27.1 lbs. of the T-2716 sorbent. The desulfurization was carried out at 600° F. (316° C.) at a space velocity of about 1,400 per hour (at STP conditions). The sorbent reduced the inlet sulfur content of the syngas from 10,920 ppmv to less than 2 ppmv in a residence time of 19 seconds. Prior to breakthrough, the sulfur loading on the sorbent was about 10 wt %. Once the sorbent in the desulfurization reactor was saturated with sulfur, it was switched to the regeneration mode and the sorbent was regenerated at 1000° F. (538° C.) with an oxygen-containing stream. Multiple desulfurization-regeneration cycles were carried out without any evidence of performance degradation.

It is to be understood that the phraseology or terminology employed herein is for description and not of limitation. Therefore, while the embodiments herein have been described in terms of preferred embodiments, those skilled in the art will recognize that the embodiments herein can be practiced with modification within the spirit and scope of the appended claims.

Accordingly, while the disclosure has been set forth herein in reference to specific aspects, features and illustrative embodiments, it will be appreciated that the utility of the disclosure is not thus limited, but rather extends to and encompasses numerous other variations, modifications and alternative embodiments, as will suggest themselves to those of ordinary skill in the field of the present disclosure, based on the description herein. Correspondingly, the disclosure as hereinafter claimed is intended to be broadly construed and interpreted, as including all such variations, modifications and alternative embodiments, within its spirit and scope.

What is claimed is:

1. A continuous operation desulfurization process for desulfurizing a gas stream containing reduced sulfur species at concentration in a range of from about 5 to about 5000 ppmv, wherein said reduced sulfur species is hydrogen sulfide ($H_2S$), carbonyl sulfide (COS), carbon disulfide ($CS_2$), thiol with four or less carbon atoms, disulfide with four or less carbon atoms, or a mixture of two or more of the foregoing reduced sulfur species, said process comprising:

providing at least two primary adsorbent beds of desulfurization sorbent selective for said reduced sulfur species, constructed and arranged in relation to one another so that each of said adsorbent beds in operation undergoes a cyclic alternating and repeating sequence of (i) onstream desulfurization operation including contacting of said gas stream with the sorbent in the sorbent bed to produce a sulfur-reduced gas stream, and (ii) offstream regeneration operation including (a) contacting the sorbent in the sorbent bed with oxygen-containing regeneration gas to remove adsorbed sulfur species to produce a sulfur dioxide-containing regeneration gas, and optionally one or both of (b) heating of the sorbent in the sorbent bed and (c) purging of the adsorbent bed;

contacting the gas stream with the sorbent in the sorbent bed of an onstream one of said at least two primary adsorbent beds, to produce the sulfur-reduced gas stream;

during said contacting of the gas stream with the sorbent in the sorbent bed of the onstream one of said at least two primary adsorbent beds, regenerating an offstream one of said at least two primary adsorbent beds by contacting the sorbent in the offstream adsorbent bed with the oxygen-containing regeneration gas, to produce the sulfur dioxide-containing regeneration gas, and optionally performing at least one of heating and purging of the offstream adsorbent bed in said regenerating;

processing the sulfur dioxide-containing regeneration gas to remove sulfur dioxide therefrom and produce sulfur dioxide-depleted regeneration vent gas; and controlling the process in response to at least one of (A) a monitored system operating condition, and (B) a cycle time program, so that each one of said at least two adsorbent beds of desulfurization sorbent cyclically, alternatingly and repetitively undergoes said sequence of (i) onstream desulfurization operation and (ii) offstream regeneration operation, in the continuous operation of the process.

2. The process of claim 1, wherein the at least two primary adsorbent beds of desulfurization sorbent contain
(i) a transition metal oxide desulfurization sorbent as the sorbent in said primary adsorbent beds, or
(ii) a metal oxide desulfurization sorbent whose metal includes one or more than one of zinc, nickel, manganese, copper, iron, tin, cobalt, vanadium, and chromium, as the sorbent in said primary adsorbent beds, or
(iii) a metal oxide desulfurization sorbent having a pore volume of from 0.2 to 0.6 cc/g, BET surface area of from 10 to 100 m$^2$/g, and crush strength of from 5 to 15 lbs/mm, as the sorbent in said primary adsorbent beds, or
(iv) a metal oxide desulfurization sorbent as the sorbent in said primary adsorbent beds, wherein said metal oxide desulfurization sorbent reacts with said reduced sulfur species to form regenerable metal sulfide, or
(v) a metal oxide desulfurization sorbent as the sorbent in said primary adsorbent beds, and said metal oxide desulfurization sorbent in said primary adsorbent beds maintains substantially stable dynamic sulfur capacity for at least 100 regeneration cycles, or
(vi) sorbent that includes zinc oxide, or
(vii) sorbent that includes one or mote of metal oxides and/or metal salts, wherein the metal thereof includes one or more of zinc, manganese, copper, iron, and chromium, or
(viii) metal salts that include one or more of metal acetates, metal formates, metal carbonates, and metal nitrates.

3. The process of claim 1, comprising
(i) converting sulfur dioxide in said sulfur dioxide-containing regeneration gas to one or more of sulfuric acid, sodium sulfite/sulfate, ammonium sulfite/sulfate, and elemental sulfur, or
(ii) reacting sulfur dioxide in said sulfur dioxide-containing regeneration gas with one or more reactants selected from alkali and alkali earth oxides, hydroxides, carbonates, and bicarbonates.

4. The process of claim 3, wherein said one or more reactants are selected from sodium oxide, potassium oxide, calcium oxide, and magnesium oxide.

5. The process of claim 1, wherein said controlling includes operating the system at predetermined temperature, wherein said predetermined temperature is in a range of from 315° C. (600° F.) to 593° C. (1100° F.).

6. The process of claim 1, further comprising
(i) compressing air from the atmosphere to produce a compressed air stream, and separating the compressed air stream by contact with an oxygen-selective membrane module, to produce an oxygen-reduced regeneration gas as said oxygen-containing regeneration gas for the offstream regeneration operation, or
(ii) compressing air from the atmosphere to produce a compressed air stream, and separating the compressed air stream by contact with an oxygen-selective membrane module, to produce an oxygen-reduced gas stream, and reacting a fuel with the oxygen-reduced gas stream to produce an oxygen-depleted nitrogen-based inert gas for purging of the offstream adsorbent bed in the offstream regeneration operation.

7. The process of claim 1, as performed to produce said sulfur-depleted gas stream containing reduced sulfur species at concentration below 1000 ppbv.

8. The process of claim 1, wherein said regenerating an offstream one of said at least two primary adsorbent beds by contacting the sorbent in the offstream adsorbent bed with the oxygen-containing regeneration gas is performed at a gas hourly space velocity of less than 2,500 h$^{-1}$ at standard temperature (0° C.) and pressure (1 atm) (STP) conditions.

* * * * *

UNITED STATES PATENT AND TRADEMARK OFFICE
CERTIFICATE OF CORRECTION

PATENT NO. : 11,225,618 B1
APPLICATION NO. : 17/425868
DATED : January 18, 2022
INVENTOR(S) : Raghubir Prasad Gupta et al.

It is certified that error appears in the above-identified patent and that said Letters Patent is hereby corrected as shown below:

In the Specification

Column 2, Line 57, "H$_2$Sis" should be -- H$_2$S is --.

Column 6, Line 32, "regenerate" should be -- regenerable --.

Column 6, Line 36, "regenerate" should be -- regenerable --.

Column 19, Line 23, "regenerate" should be -- regenerable --.

Column 19, Line 24, "erate" should be -- erable --.

Column 22, Line 29, "mote" should be -- more --.

Column 24, Line 3, "(>2" should be -- O$_2$ --.

Column 27, Line 62, "19" should be -- 1.9 --.

In the Claims

Column 29, Line 26, Claim 2 "mote" should be -- more --.

Signed and Sealed this
Nineteenth Day of April, 2022

Katherine Kelly Vidal
*Director of the United States Patent and Trademark Office*